United States Patent Office 3,547,903
Patented Dec. 15, 1970

---

3,547,903
CINNAMOYL DERIVATIVES OF 3 - AMINO - 4 - HYDROXY - 8 - METHYL - 7 - [3 - O - (5 - METHYL - 2 - PYRROLYLCARBONYL)NOVIOSYLOXY] COUMARIN
Martin John Cron, Fayetteville, Elizabeth Almira Ragan, Syracuse, and Irving R. Hooper, Fayetteville, N.Y., assignors to Bristol-Myers Company, New York, N.Y., a corporation of Delaware
No Drawing. Continuation-in-part of application Ser. No. 612,328, Jan. 30, 1967. This application Mar. 22, 1968, Ser. No. 715,159
Int. Cl. C07c 47/18
U.S. Cl. 260—210
16 Claims

ABSTRACT OF THE DISCLOSURE

3 - cinnamoyl derivatives of 3 - amino - 4 - hydroxy - 8 - methyl - 7 - [3 - O - (5 - methyl - 2 - pyrrolcarbonyl)noviosyloxy]coumarin are useful antibiotics for the treatment of infectious diseases in animals, including man. The compounds of the invention are prepared by the process of reacting a cinnamoyl halide or its equivalent with a tetrahydropyranyl ether derivative of coumermycin $A_1$ or $A_2$ (U.S. Pat. 3,201,386) to produce compounds of the formula

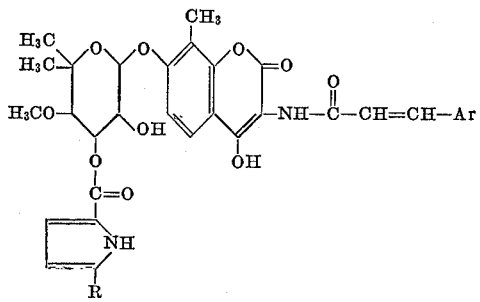

wherein R is either hydrogen or methyl, and Ar is a group having the formula

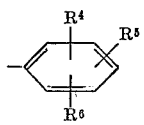

in which each of $R^4$, $R^5$ and $R^6$ represents hydrogen, fluoro, chloro, bromo, iodo, trifluoromethyl, trichloromethyl, amino, N-(lower)alkylamino, N,N-di(lower)alkylamino, nitro, cyano, (lower)alkyl, (lower)alkoxy, hydroxy, carboxamido, N-(lower)alkylcarboxamido, N, N-di(lower) alkylcarboxamido, carboxy, carb(lower) alkoxy, acetoxy, mercapto, thioacetoxy or (lower) alkylthio; and the pharmaceutically acceptable cationic salts thereof.

---

CROSS-REFERENCES TO RELATED APPLICATIONS

This application is a continuation-in-part of our co-pending application Ser. No. 612,328, filed Jan. 30, 1967, and now abandoned.

BACKGROUND OF THE INVENTION

Field of the invention

This invention relates to chemical compounds useful as antibiotics in the treatment of bacterial infections afflicting animals, including man, and more particularly to unsubstituted and substituted 3-cinnamido-4-hydroxy-8 - methyl - 7 - [3 - O - (5 - methyl - 2 - pyrrolycarbonyl)-noviosyloxy]coumarins.

Description of the prior art

There exists a need to provide alternative and improved agents for the treatment of infections caused by resistant strains of bacteria, e.g., benzylpenicillin-resistant strains of *Staphylococcus aureus* (*Micrococcus pyogenes* var. *aureus*), or for the decontamination of objects bearing such organisms, e.g., hospital equipment, walls of operating rooms and the like.

SUMMARY OF THE INVENTION

The 3 - cinnamamido - 4 - hydroxy - 8 - methyl - 7 - [3 - O - (5 - methyl - 2 - pyrrolylcarbonyl)noviosyloxy] coumarins of the present invention are compounds having the formula

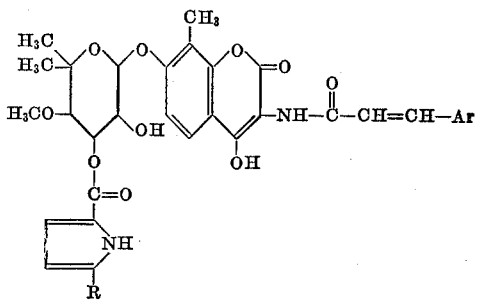

wherein R is either hydrogen or methyl but preferably methyl and Ar is a group having the formula

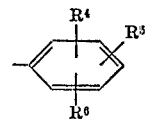

wherein each of $R^4$, $R^5$ and $R^6$ represents those moieties described above; and the pharmaceutically acceptable salts thereof.

DISCLOSURE OF THE INVENTION

This invention relates to antibacterial agents which are derivatives of the antibiotic substances coumermycin $A_1$ and coumermycin $A_2$ (U.S. Pat. 3,201,386) and to processes for their production. More particularly it relates to products resulting from the acylative cleavage of the tetrahydropyranyl ethers of coumermycins $A_1$ and $A_2$ and to the process of preparing same by the reaction of an acylating agent of the cinnamic acid series with said tetra-hydropyranyl (THP) derivatives.

Coumermycin $A_1$ (R is methyl) and coumermycin $A_2$ (R is hydrogen)

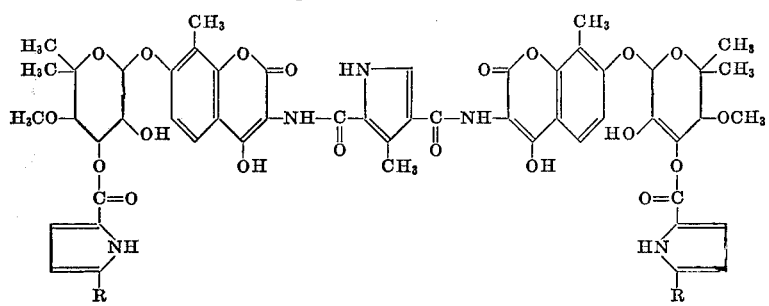

are effective in inhibiting the growth of gram-positive bacterial. Both are nontoxic and exhibit a therapeutic effect on mice infected with gram-positive bacteria. A major disadvantage of the coumermycins however is their poor absorption and resultant low blood levels. Efforts to correct these deficiencies have resulted according to the present invention, in new and novel N-cinnamoyl cleavage products of the parent coumermycins, said compounds being antibacterial agents active against *Staphylococcus aureus* Smith.

These objectives were obtained by the provision, according to the present invention, of the compounds having the formula

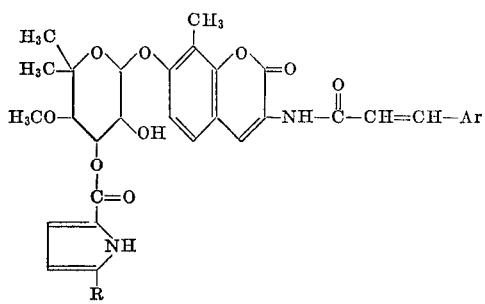

wherein R is either hydrogen or methyl, and Ar is a group having the formula

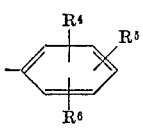

in which each of $R^4$, $R^5$ and $R^6$ represents hydrogen, fluoro, chloro, bromo, iodo, trifluoromethyl, trichloromethyl, amino, N-(lower)alkylamino, N,N-di(lower)alkylamino, nitro, cyano, (lower)alkyl, (lower)alkoxy, hydroxy, carboxamido, N-(lower)alkylcarboxamido, N,N-di(lower)alkylcarboxamido, carboxy, carb(lower)alkoxy, acetoxy, mercapto, thioacetoxy or (lower)alkylthio; and the nontoxic, pharmaceutically acceptable cationic salts thereof.

A more limited and preferred embodiment of the present invention comprises the compounds having the Formula I, wherein R is either hydrogen or methyl, and Ar is a group having the formula

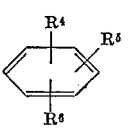

in which each of $R^4$, $R^5$ and $R^6$ represents hydrogen, fluoro, chloro, bromo, iodo, trifluoromethyl, amino, N,N-di(lower)alkylamino, nitro, cyano, (lower)alkyl, (lower)alkoxy, hydroxy, carboxy, carb(lower)alkoxy, acetoxy, mercapto, thioacetoxy or (lower)alkylthio; and the nontoxic pharmaceutically acceptable cationic salts thereof.

A further limited and preferred embodiment of the present invention comprises the compounds having the Formula I, wherein R is either hydrogen or methyl, and Ar is a group having the formula

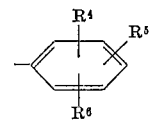

in which each of $R^4$, $R^5$ and $R^6$ represents hydrogen, fluoro, chloro, bromo, iodo, trifluoromethyl, N,N-di(lower)alkylamino, nitro, cyano, (lower)alkyl, (lower)alkoxy, N,N-di(lower)alkylcarboxamido, carb(lower)alkoxy, acetoxy, thioacetoxy or (lower)alkylthio; and the nontoxic, pharmaceutically acceptable cationic salts thereof.

A particularly preferred embodiment of the present invention is the group of compounds having the Formula I wherein R is either hydrogen or methyl, and Ar is a group having the formula

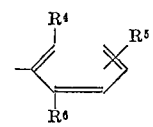

in which $R^4$, $R^5$ and $R^6$ represents hydrogen, fluoro, chloro, bromo, iodo, trifluoromethyl, amino, N,N-di(lower)alkylamino, nitro, cyano, (lower)alkyl, (lower)alkoxy, hydroxy, carboxy, carb(lower)alkoxy, acetoxy, mercapto, thioacetoxy or (lower)alkylthio; and wherein no more than one of the group $R^4$, $R^5$ and $R^6$ shall be hydrogen; and the nontoxic, pharmaceutically acceptable cationic salts thereof.

Another preferred group of compounds within the scope of the present invention comprises the compounds having the Formula I, wherein R is either hydrogen or methyl, and Ar is a group having the formula

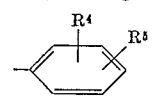

in which each of $R^4$ and $R^5$ represents hydrogen, fluoro, chloro, bromo, iodo, trifluoromethyl, amino, N,N-di-(lower)alkylamino, nitro, cyano, (lower)alkyl, (lower)alkoxy, hydroxy, mercapto, carboxy, carb(lower)alkoxy, acetoxy, thioacetoxy, or (lower)alkylthio and the nontoxic, pharmaceutically acceptable cationic salts thereof.

The term "(lower)alkyl" as used herein means both straight and branched chain aliphatic hydrocarbon radicals having from one to eight carbon atoms such as methyl, ethyl, propyl, isopropyl, butyl, isobutyl, t-butyl, amyl, hexyl, etc. Where the term "(lower)" is used as part of the description of another group e.g. "(lower)alkoxy," it refers to the alkyl portion of such group which is therefore as described above in connection with "lower)alkyl" and thus includes such radicals as methoxy, ethoxy, isopropoxy, etc.

Also included within the scope of the present invention is the process which comprises the consecutive steps of mixing together a compound having the formula

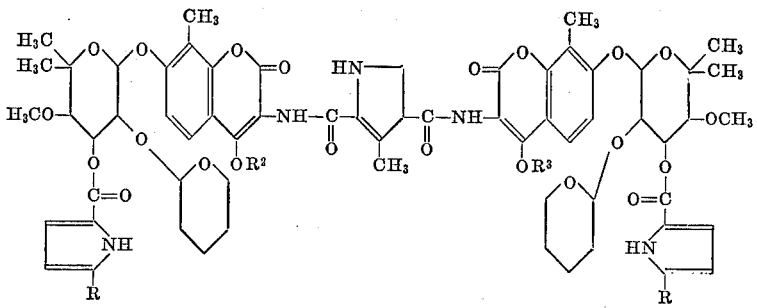

wherein R is hydrogen or methyl, and $R^2$ and $R^3$ are the same or different and are either —H or

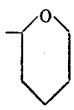

with an acid halide having the formula

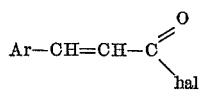

or its functional equivalent as an acylating agent in which Ar is a group having the formula

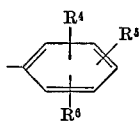

in which $R^4$, $R^5$ and $R^6$ each represent hydrogen, fluoro, chloro, bromo, iodo, trifluoromethyl, trichloromethyl, di(lower)alkylamino, nitro, cyano, acetoxy, (lower)alkyl, (lower)alkoxy, N,N-di(lower)alkylcarboxamido, thioacetoxy, carb(lower)alkoxy or (lower)alkylthio; to produce a compound having the formula

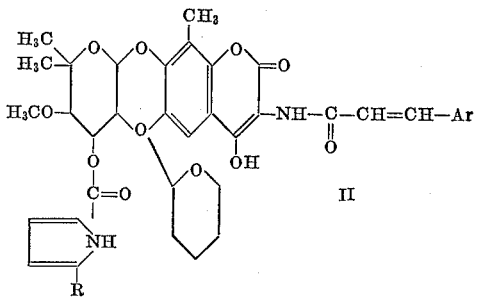

wherein R and Ar are as described above; and allowing said tetrahydropyranyl ether to stand in a polar solvent in the presence of a catalytic amount of an acid to produce a compound having the Formula I.

Thus mixing together a 2′,2′,4,4-O,O,O,O-tetratetra hydropyranylcoumermycin, or a 2′,2′,4-O,O,O-tritetrahydropyranylcoumermycin or a 2′,2′-O,O-ditetrahydropyranylcoumermycin, or mixtures thereof, an excess of an unsubstituted or substituted cinnamoyl halide or cinnamic acid anhydride, or their functional equivalents as acylating agents for the production of N-mono-substituted amides, in a proton accepting solvent for several hours at about room temperature or at elevated temperatures produces a compound having the Formula II wherein R and Ar are as described above in Formula II, and subsequently allowing the above compound II to stand in a polar solvent, such as an alcohol, in the presence of a catalytic amount of an acid cleaves the tetrahydropyranyl ether linkage to produce a compound having the Formula I.

Compounds having the Formula I possess potent antibacterial activity, e.g., against *Staphylococcus aureus*. They are well absorbed and produce good blood levels upon oral or parenteral administration to mammals.

The compounds prepared by the process described above are readily modified into compounds containing moieties other than those attached to the benzene ring of the Ar group referred to above in Formula I. Said compounds are also considered an integral part of the instant invention.

When compounds having Formula I contain a nitro, cyano, acetoxy, thioacetoxy

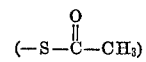

or carb(lower)alkoxy function in the Ar group, it is possible to change the above functions to a new species.

Mild hydrolysis of the acetoxy, thioacetoxy and carb(lower)alkoxy functions will produce Ar groups containing hydroxy, mercapto and carboxy functions respectively. Similarly reduction of a nitro function will produce an Ar group containing an amino function.

Amination of the resultant carboxy function above may produce N-substituted or unsubstituted carboxamido functions on the Ar group. N-alkylation of the amino function above may produce N-(lower)alkylamino or N,N-di-(lower)alkylamino functions on the Ar group.

The compounds of the instant invention having the general Formula I all possess an acidic hydroxyl function at the 4 position of the coumarin moiety. The acidic nature of the hydroxyl allows one to readily prepare non-toxic pharmaceutically acceptable, cationic salts of the compounds having the Formula I, e.g., sodium, potassium, calcium, aluminum and ammonium salts and their non-toxic substituted ammonium salts with an amine selected from the group consisting of trialkylamines, procaine, dibenzylamine, N - benzyl - beta-phenethylamine, 1-ephenamine, N,N′ - dibenzylethylenediamine, dehydroabietylamine, N,N′-bis-dehydroabietylethylenediamine and N-(lower)alkylpiperidines, e.g., N-ethylpiperidine.

In the treatment of bacterial infections in mammals, including man, the compounds of this invention are administered orally or parenterally, in accordance with conventional procedures for antibiotic administration, in an amount of from about 5 to 60 mg./kg./day, and preferably about 20 mg./kg./day in divided doses, e.g., three or four times a day. They are administered in dosage units containing, for example, 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

The objectives of the present invention have been achieved, by the provision according to the present invention, of the process for the synthesis of compounds having the formula

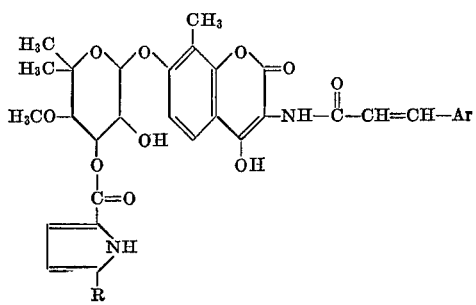

wherein
R is either hydrogen or methyl, and
Ar is a group having the formula

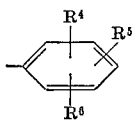

in which
each of $R^4$, $R^5$ and $R^6$ represents hydrogen, fluoro, chloro, bromo, iodo, trifluoromethyl, trichloromethyl, thioacetoxy, N,N-di(lower)alkylamino, carb(lower)alkoxy, nitro, cyano, (lower)alkyl, (lower)alkoxy, actoxy or N,N-di(lower)alkylcarboxamido; which comprises the consecutive steps of
(a) mixing together a compound having the formula

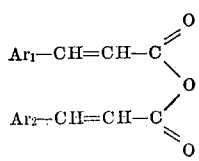

wherein
R is hydrogen or methyl, and
$R^2$ and $R^3$ are the same or different and are either —H or

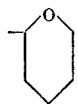

with an acid halide having the formula

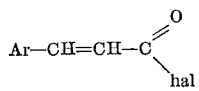

or its functional equivalent as an acylating agent, functional equivalent being more specifically defined as a compound having the formula

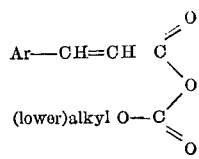

in which
$Ar^1$ and $Ar^2$ are alike and are the same as Ar,
Ar being a group having the formula

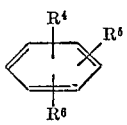

in which
$R^4$, $R^5$ and $R^6$ each represent hydrogen, fluoro, bromo, iodo, trifluoromethyl, trichloromethyl, N,N-di(lower)alkyl-amino, nitro, cyano, (lower)alkyl, (lower)alkoxy, acetoxy, N,N-di(lower)alkylcarboxamide, —S—$COCH_3$ (lower)alkylthio or carb(lower)alkoxy,
in a homogeneous or heterogeneous system capable of inactivating protons, said system comprising an inorganic or organic base selected from the group consisting of an alkali carbonate or bicarbonate, alkali earth metal carbonate or bicarbonate, a pyridine or a tri(lower)alkylamine, alone or in combination with an inert solvent selected from the group consisting of tetrahydrofuran, benzene, toluene, xylene, ether, chloroform, etc., but preferably in a solvent system comprising a pyridine or a tri(lower)alkylamine alone or in combination with an inert solvent,
at a temperature in the range of —20° C. to 150° C., but preferably in the range of —5° C. up to the boiling point of the solvent system used, to produce a compound having the formula

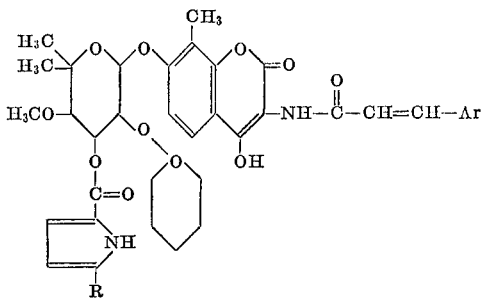

wherein R and Ar are as described above; and
(b) allowing said tetrahydropyranyl ether to stand, preferably in homogeneous solution,
in a (lower)alkanol solvent, i.e., methanol, ethanol, etc., or in a co-solvent system containing an alcohol, with or without the aid of heat, but preferably at a temperature in the range of 0° C. up to the boiling point of the solvent system used,
in the presence of a catalytic amount of an acid selected from the group consisting of mineral acids, arylsulfonic acids, Lewis acids, acid resins, activated carboxylic acids, or alkylsulfonic acids, but preferably arylsulfonic acids, to produce a compound of the present invention having the formula

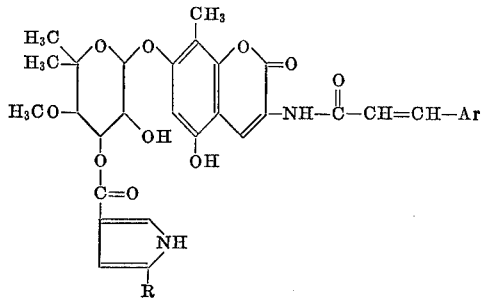

I wherein R and Ar are as described above.

The process, at temperatures in the range of −25 to 25° C., is usually performed by dissolving or suspending 2′,2′,4,4-O,O,O,O - tetratetrahydropyranylcoumermycin, or 2′,2′-O,O-tritetrahydropyranylcoumermcin or 2′,2′-O,O-ditetrahydropyranylcoumermycin, or mixtures thereof, in a proton accepting solvent (organic nucleophile) usually selected from the group consisting of a pyridine, or (lower) trialkylamine such as trimethylamine, triethylamine, or one of these in combination with an inert solvent, an example of which may be tetrahydroalent, preferably in a ratio of two to four moles of furan, benzene, toluene, xylene, chloroform, or ether. The mixture is cooled to about 10° C. by an ice-water bath. An excess of an unsubstituted or substituted cinnamoyl halide or cinnamic acid anhydride, or its functional equivacylating agent to one mole of coumermycin tetrahydropyranyl ether, is added with vigorous stirring. Stirring is maintained for several hours following which the solution is concentrated to a syrup by evaporation in vacuo at temperatures below 25° C. The material isolated by this technique is characterized as a bis-imide, having the formula

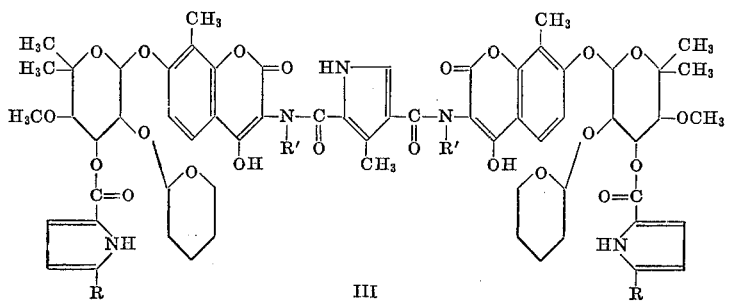

III

An integral part of the instant invention is the inclusion of those compounds directly derived from Formula I above which are defined as those compounds of Formula I wherein Ar is a group having the formula

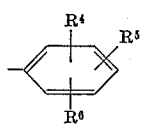

wherein each of $R^4$, $R^5$ and $R^6$ represents hydrogen, fluoro, chloro, bromo, iodo, trifluoromethyl, trichloromethyl, amino, N-(lower)alkylamino, N,N-di(lower)alkylamino, nitro, cyano, (lower)alkyl, (lower)alkoxy, hydroxyl, carboxamido, N-(lower)alkylcarboxamido, N,N-di(lower)alkylcarboxamido, carboxy, carb(lower)alkoxy, acetoxy, mercapto, thioacetoxy or (lower)alkylthio.

In the preferred embodiments of the present invention R is as defined above, and is especially methyl, Ar is as defined above and is especially nitrophenyl, acetoxyphenyl, dihalophenyl, phenyl, aminophenyl, aminodihalophenyl, dimethoxyphenyl, hydroxyphenyl and di-(trifluoromethyl)phenyl; and most particularly Ar is mono- or di-substituted in the ortho positions.

The process can be conducted under varying conditions the most critical being the temperature at which the acylative step is performed. When lower temperatures in the range of −25 to 25° C. are employed, it is possible to isolate intermediates from the process that are not isolated when the process is conducted at higher temperatures, these intermediates being readily convertible to the desired N-cinnamoyl derivative by the use of heat and an organic nucleophile such as pyridine.

wherein R is hydrogen or methyl and R' is

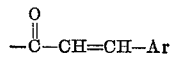

Ar being as defined above.

Warming the isolated bis-imide in a water-wet proton accepting organic solvent from the group described above at 50° C. overnight, or by refluxing in said solvent for a minimum time of three hours, results in the formation of compounds having the Formula II.

Mixing the above compound II in a polar solvent such as a (lower)alkanol, i.e., methanol, ethanol, propanol, etc., in the presence of a catalytic amount of an acid, with or without the aid of heat, produces compounds having the Formula I.

The addition of a suitable acid is necessary to catalyze the cleavage of the tetrahydropyranyl group from compound II. The acid employed is usually selected from one of the following groups:

(1) Concentrated Mineral Acids such as sulfuric acid, phosphoric acid, phosphorous acid, and hydrochloric acid.

(2) Arylsulfonic Acids having the following formula

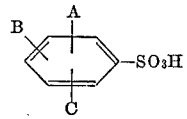

in which each of A, B and C are alike or different and are hydrogen, halogen, (lower)alkyl, (lower)alkoxy, nitro, aryl, or cyano.

(3) Lewis Acids such as $SnCl_4$, $AlCl_3$, $BF_3$, $ZnCl_2$, $FeCl_3$.

(4) Acid Resins in their acidic form (H+) such as the phenolic sulfonic acids, polystyrene sulfonic acids, polystyrene phosphorous acids, polystyrene phosphonic acids, acrylic carboxylic acids, polystyrene nuclear sulfonic acids, methacrylic carboxylic acid, and in particular macroreticular polystyrene sulfonic acid ("Amberlyst 15"—Rohm and Haas).

(5) Activated Carboxylic acids such as $F_3C-CO_2H$, $F_2CHCO_2H$,

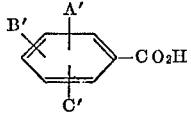

herein A', B' and C' are alike or different but are nitro, fluoro, cyano or hydrogen.

(6) Alkylsulfonic Acids having the formula $$R-(CH_2)_xSO_3H$$

wherein
R is selected from the group consisting of aryl, substituted aryl, (lower)alkyl, substituted (lower)alkyl; and where
X is a whole integer of 0 to 6 inclusive.

The process, at temperatures above 25° C., and up to the boiling point of the solvent employed, is usually performed by dissolving or suspending 2',2',4,4-O,O,O,O-tetratetrahydropyranylcoumermycin, or 2',2',4 - O,O,O-tritetrahydropyranylcoumermycin, or 2',2'-O,O-ditetrahydropyranylcoumermycin, or mixtures thereof in a proton accepting solvent (organic nucleophile) usually selected from the group consisting of a pyridine, or (lower)-trialkylamine such as trimethylamine, triethylamine; or one of these in combination with an inert solvent, an example of which may be tetrahydrofuran, benzene, toluene, xylene, chloroform or ether.

An excess of an unsubstituted or substituted cinnamoyl halide or cinnamic acid anhydride, or its functional equivalent, preferably in a ratio of two to four moles of acylating agent to one mole of coumermycin tetrahydropyranyl ether, is added to the tetrahydropyranyl ether mixture with vigorous stirring. The resultant mixture is slowly warmed to temperatures up to the boiling point of the solvent employed for a period of time usually in excess of thirty minutes but rarely longer than 40 hours, during which time the solution turns orange to brown in color. The solution is evaporated in vacuo to a syrup and poured into vigorously stirred ice-water. The crystalline product collected is characterized as a mixture consisting of material of Formula II, in addition to lesser quantities of material characterized as having the formulas

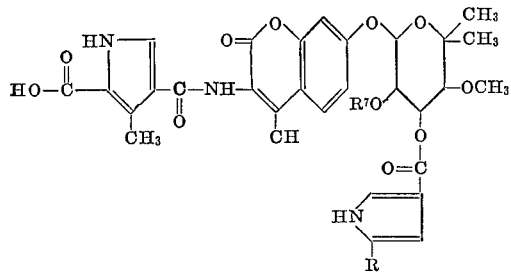

and/or

IV

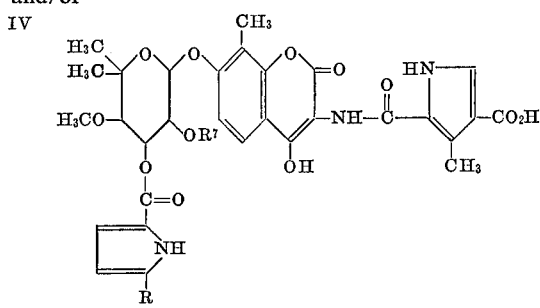

and

V

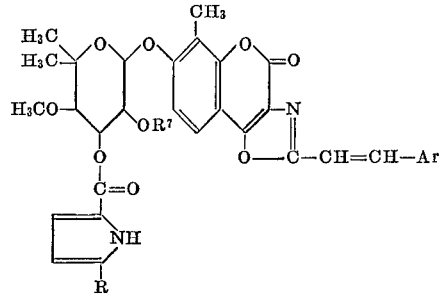

wherein R is hydrogen or methyl, $R^7$ is hydrogen or

and Ar is as defined above.

The mixture is subsequently separated to its component parts by fractional crystallization, chromatography or some other equivalent method. The material of Formula II is then dissolved in a polar solvent such as a (lower)alkanol, i.e., methanol, ethanol, propanol, etc., in the presence of a catalytic amount of an acid from the group described previously, with or without the aid of heat, to produce a compound of Formula I.

While the acylative cleavage proceeds readily by both of the above detailed procedures, it has been observed that the process proceeds most readily with the highest percentage yields of desired product and with the lowest quantity of decomposition products, i.e., oxazole formation and color, when a small quantity of water is added to the mixture of the coumermycin tetrahydropyranyl ether just prior to the addition of the acylating agent. Furthermore, it has been observed that when the ratio of acylating agent to coumermycin tetrahydropyranyl ether is kept below 5:1, the quantity of oxazole, V, formed is kept minimal.

The resultant products of the instant invention described herein have been found to exist in various states of hydration, i.e., anhydrous, monohydrated, and polyhydrated. For the purpose of the disclosure, the invention is considered to embody all such forms as an integral part of same.

The tetrahydropyranyl ethers of coumermycin $A_1$ and $A_2$ described herein do not form part of the present invention. They are the invention of our colleague Donald Edward Nettleton, Jr. and are disclosed and claimed in his application Ser. No. 583,992, filed Oct. 3, 1966 U.S. Pat. No. 3,380,994.

PREPARATION OF THE TETRAHYDROPYRANYL ETHERS OF COUMERMYCIN $A_1$ OR $A_2$

Pure coumermycin $A_1$ or coumercycin $A_2$ is mixed together with excess dihydropyran in the presence of an acid catalyst and an inert solvent to yield mixtures of mono, di, tri and tetra-tetrahydropyranyl ether derivatives of coumermycin $A_1$ or $A_2$ respectively.

More specifically, a coumermycin is mixed together with dihydropyran in various molar proportions, but preferably in a ratio of one mole of coumermycin to more than 20 moles of dihydropyran.

The addition of a suitable acid to the coumermycin-dihydropyran mixture as a catalyst is essential. The acid employed is usually selected from the group consisting of those previously mentioned in the tetrahydropyranyl ether cleavage step.

The quantity of the acid employed as the catalyst is usually determined by the reaction conditions, the bulk of the catalyst and the amount at which the optimum yield of product is obtained.

The reaction may be conducted with or without the use of a co-solvent, the co-solvent usually being employed to increase the solubility of the reactants and reduce the viscosity of the mixture. The co-solvent used is inert and is usually selected from the group consisting of tetrahydrofuran, dioxane, diethyl ether, the dipropyl ethers, the dibutyl ethers, benzene, xylene and toluene.

The reaction is exothermic. Its temperature can be carefully controlled or it can be allowed to seek its own level without substantial differences in the end result. The process is usually conducted at a temperature of 0°–100° C., but preferably in the temperature range of 25° to 60° C. for a period of time dependent upon the temperature used and ultimately upon the completion of reaction and the yields obtained.

As mentioned previously, the process usually results in the formation of mixtures of mono, di, tri and tetra-substituted tetrahydropyranyl ether derivatives of the coumermycins. The ratio of the components of the mixture however, is largely dependent upon the reaction conditions, and most particularly the method of work-up and purification of same.

When the reaction is conducted at elevated temperatures of 60–80° C. for 2 to 4 hours, or at lower temperatures for longer periods of time, under very anhydrous conditions, followed by purification in the absence of polar solvents, there is obtained a product consisting of 80 to 99% pure 2′,2′,4,4-O,O,O,O-tetratetrahydropyranylcoumermycin. The other possible tetrahydropyranylcoumermycins are usually found in the following order of their relative concentration: 2′,2′,4-O,O,O-tritetrahpyropyranyl>2′,2′, - O,O - ditetrahydropyranyl> 2′-O-monotetrahydropyranyl>coumermycin.

When the reaction is conducted at lower temperatures, or for shorter periods of time, or under conditions not as anhydrous, the proportion of the 2′,2′,4,4-O,O,O,O-tetratetrahydropyranylcoumermycin in the mixture decreases as the proportion of the other tetrahydropyranyl ethers increases.

It is a fact that the tetrahydropyranyl moiety attached to either or both 4-O-positions of the coumermycin molecule is quite labile in the presence of polar solvents. When 2′,2′,4,4-O,O,O,O-tetratetrahydropyranylcoumermycin or 2′,2′,4-O,O,O-tritetrahydropyranylcoumermycin is crystallized or recrystallized from a hot alcoholic solvent system, the 4-O-tetrahydropyranyl ether functions are cleaved to 4-hydroxyl functions to yield pure 2′,2′,O,O-ditetrahydropyranylcoumermycin. The 2′,O - tetrahydropyranyl ether functions are generally stable when crystallization is carried out in the absence of acidic materials.

Resolution of mixtures of the tetrahydropyranyl ether derivatives can be accomplished by counter-current distribution purification. As a practical matter, the material is suitable as a mixture of di, tri and tetra-tetrahydropyranylcoumermycin, or it can be crystallized from a hot alcoholic solvent system to yield pure 2′,2′-O,O-ditetrahydropyranylcoumermycin, for use as an intermediate in its ultimate conversion to the N-cinnamoyl cleavage products of the present invention.

The assay used in the examples below is the standard coumermycin $A_1$ assay which is run on Petri plates prepared by using ten ml. of Baltimore Biological Laboratories (BBL) base agar and a top layer of four ml. of BBL seed agar innoculated with *Staph. aureus* ATCC 6538 P. The plates are incubated for 18 hours at 30° C. A standard activity curve for coumermycin $A_1$ is determined by using concentrations in the range of 0.07 to 1.5 µg./ml.

In the instant invention, use of the word coumermycin, without specifically stating coumermycin $A_1$ or $A_2$ shall be taken to mean either coumermycin $A_1$ or $A_2$. Use of the words tetrahydropyranylcoumermycin shall mean the di, tri or tetra-tetrahydropyranyl ether of coumermycin or the mixtures thereof, but preferably refers to the ditetrahydropyranyl ether.

Di-, tri-, and tetra-tetrahydropyranylcoumermycin $A_1$ mixture and its resolution Coumermycin $A_1$ was stirred with tetrahydrofuran (THF) at room temperature until dissolution occurred. Dihydropyran (DHP) was added followed by Amberlyst 15 (H+) resin (containing less than 0.5% $H_2O$). As stirring continued, additional DHP was added. A gel formed that re-dissolved after one to two hours. Stirring was continued overnight at room temperature during which time the solution darkened to an orange-brown color.

The Amberlyst resin was removed by filtration and the solution concentrated in vacuo to a syrup. Dilution of the syrup with a minimal quantity of methanol yielded a crude solid (85–95% of theory). The solid was dried in vacuo. Thin layer chromatography indicated the solid consisted of at least three zones ($R_f$ 0.60–0.70) when resolved using 9:21:8 (parts by volume) of methyl acetate:2-propanol:concentrated $NH_4OH$.

A Craig counter-current distribution separation was run on a 15 g. sample of the mixture using ½ volume upper phase to 1 volume lower phase from a system of 5:1:5:1 of $CCl_4$:$CHCl_3$:$CH_3OH$:$H_2O$ over 1001 transfers, 97.5% of the solid being recovered in total. The recoveries by evaporation and subsequent crystallization from the major concentrations as determined by Ultra Violet absorption at 345 mµ were as follows:

2′,2′,4,4-O,O,O,O-tetratetrahydropyranylcoumermycin $A_1$

The tetra-substituted tetrahydropyranyl ether of coumermycin $A_1$ was recovered from tubes 21 through 40 as a pure crystalline solid, 3.68 g., M.P. decomposition above 200° C.

*Analysis.*—Calc'd for $C_{75}H_{91}N_5O_{24}$ (percent): C, 62.27; H, 6.34; N, 4.84. Found (percent): C, 62.03; H, 6.31; N, 4.94.

2′,2′,4-O,O,O-tritetrahydropyranylcoumermycin $A_1$

The tri-substituted tetrahydropyranyl ether of coumermycin $A_1$ was recovered from tubes 41–70 as a pure crystalline solid, 3.8 g., M.P. decomposition above 200° C.

*Analysis.*—Calc'd for $C_{70}H_{33}N_5O_{23}$ (percent): C, 61.71; H, 6.14; N, 5.14. Found (percent): C, 61.65; H, 6.19; N, 5.34.

2′,2′,-O,O-ditetrahydropyranylcoumermycin $A_1$

The di-substituted tetrahydropyranyl ether of coumermycin $A_1$ was recovered from tubes 71–100 as a pure crystalline solid, 1.8 g., M.P. decomposition above 200° C.

*Analysis.*—Calc'd for $C_{65}H_{75}O_{22}N_5$ (percent): C, 61.06; H, 5.91; N, 5.47. Found (percent): C, 61.00; H, 5.83; N, 5.56.

2′-O-monotetrahydropyranylcoumermycin $A_1$

The mono-substituted tetrahydropyranyl ether of coumermycin $A_1$ was recovered from tubes 101–130 as a pure crystalline solid, 1.6 g., M.P. decomposition above 200° C.

*Analysis.*—Calc'd for $C_{60}H_{65}N_5O_{21}$ (percent): C, 60.35; H, 5.66; N, 5.86. Found (percent): C, 60.42; H, 5.81; N, 5.83.

Coumermycin $A_2$ was recovered unreacted from tubes 300–499, 1.5 g., M.P. decomposition 240–245° C.

2′,2′-O,O-ditetrahydropyranyl-coumermycin $A_1$ (direct method)

Coumermycin $A_1$ (1110.06 g., 1.0 mole) was slurried in a mixture of 11.2 liters of dry THF and 11.2 liters of dry DHP. p-Toluenesulfonic acid monohydrate (2.2 g.) was added and the solution was stirred for twenty hours at room temperature. The solution was concentrated to ⅓ of the volume in vacuo at less than 40° C., filtered and the filtrate poured into 134 liters of dry methanol at 0° C. The product crystallized upon stirring for 30 minutes at 0–5° C. and was collected by filtration. The filter cake was covered by dry solvent at all times while washing same with 10 liters of dry, cold methanol, followed by 5 liters of petroleum ether.

15

Recrystallizaton from hot methanol yielded the desired 2',2'-O,O-ditetrahydropyranyl ether.

PREPARATION OF CINNAMIC ACIDS

The cinnamic acids used as starting materials in the process of the instant invention were purchased commercially or were prepared by one of the methods commonly used by those skilled in the art, i.e.:

(1) Claisen reaction

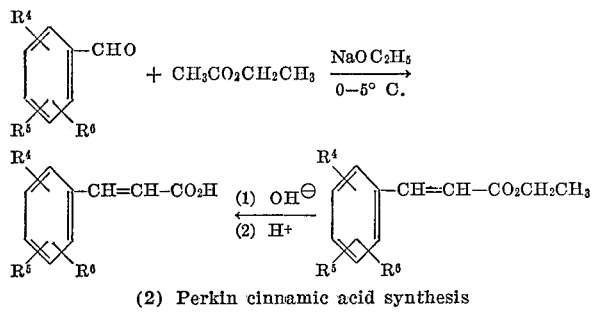

(2) Perkin cinnamic acid synthesis

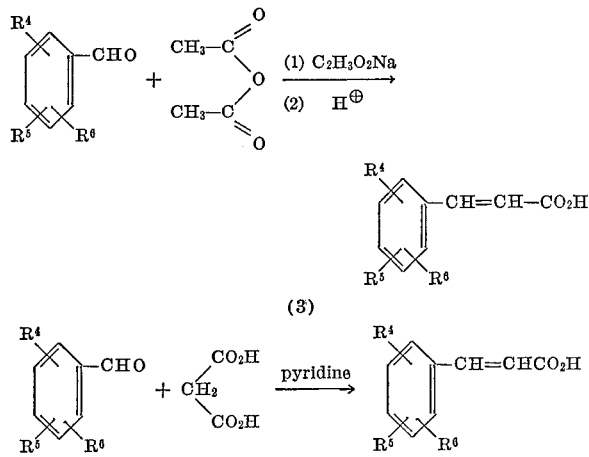

(3)

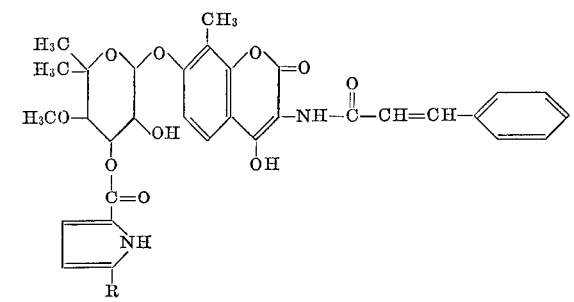

wherein $R^4$, $R^5$ and $R^6$ are alike or different and are selected from the group consisting of hydrogen, fluoro, chloro, bromo, iodo, trifluoromethyl, trichloromethyl, amino, N-(lower)alkylamino, N,N-di(lower)alkylamino, nitro, cyano, (lower)alkyl, (lower)-alkoxy, hydroxycarboxamido, N-(lower)alkylcarboxamido, N-N-di(lower)alkylcarboxamido, carboxy, carb(lower)alkoxy, acetoxy, mercapto, thioacetoxy or (lower)alkylthio; and the nontoxic, pharmaceutically acceptable cationic salts thereof.

(1) Fieser & Fieser, Advanced Organic Chemistry, Reinhold Publishing Co., p. 469 (1961).

(2) H. Kraush and W. Kuny, Organic Name Reactions, John Wiley & Sons, p. 344 (1964).

(3) Organic Synthesis, Collective Volume IV, John Wiley & Sons, p. 731.

The substituted benzaldehydes used in the preparation of the above described cinnamic acids are commercially available, known compounds, or are readily prepared by methods commonly known to those skilled in the art.

PREPARATION OF ACYLATING AGENTS

The acylating agents employed in the process of the instant invention were prepared, when not available commercially, from the corresponding cinnamic acid derivative by generally known procedures.

(a) The Acid Halides were prepared by mixing together the cinnamic acid with thionyl halide, with or without the aid of heat, followed by purification by distillation or by crystallization from an inert solvent, i.e., benzene, "Skellysolve B," etc.

(b) The Acid Anhydrides were prepared by mixing together the cinnamic acid with acetic anhydride, with or without the aid of heat, usually followed by purification by crystallization from an inert solvent, i.e., benzene, "Skellysolve B," ethyl acetate, etc.

(c) The Mixed Acid Anhydrides were prepared by mixing together the cinnamic acid with ethyl chloroformate in the presence of pyridine with or without the aid of heat, usually followed by "in situ" use on the desired tetrahydropyranylcoumermycin $A_1$ or $A_2$.

These methods work in the preparation of a wide variety of cinnamic acid acylating agents as is exemplified in the examples of the instant invention.

DESCRIPTION OF THE PREFERRED EMBODIMENTS

The following examples will serve to illustrate but not to limit the present invention.

EXAMPLE 1

3-cinnamamido-4-hydroxy-8-methyl-7-[3-O-(5-methyl-2-pyrrolylcarbonyl)noviosyloxy]coumarin A solution of 6.0 g. tetrahydropyranyl coumermycin $A_1$, 3.32 g. cinnamoyl chloride and 6.0 ml. of pyridine in 150 ml. tetrahydrofuran was warmed to 50° C., the flask stoppered and then heated for three hours at the same temperature. The reaction mixture was then cooled, concentrated in vacuo to one third original volume and poured slowly into a 300 ml. mixture of vigorously stirred ice and water. The pH was adjusted to 2.0 by the addition of diluted HCl and the mixture stirred for 30 minutes. The precipitate was recovered by filtering, washed with 800 ml. of $H_2O$ in several portions and then air-dried. The product was then dried overnight in a vacuum desiccator over anhydrous BaO; yield, 8.7 g. A 7.0 g. portion of the above solid was dissolved in 70 ml. pyridine containing 0.15 ml. $H_2O$ and the resulting solution heated at 50° C. for 23 hours. The product was recovered by concentrating, precipitating, filtering and air drying in the same manner as above. To remove the tetrahydropyranyl group the product was suspended in 150 ml. methanol, a 2.0 g. portion of p-toluenesulfonic acid added and the mixture stirred for 16 hours at 25° C. The mixture was poured into a 300 ml. mixture of ice and water and the product recovered by filtering, washing with water and then air-drying; yield, 4.2 g. A 4.0 g. portion of these solids was dissolved in 100 ml. of boiling ethyl acetate. Skellysolve B (petroleum solvent, B.P. 60–68° C. essentially n-hexane) was added until solution became turbid and the mixture then cooled in an ice bath. After filtering to remove this fraction the process was continuously repeated. The fifth fraction, 373 mg., was found to be the title product by infrared (IR), Nuclear Magnetic Resonance (NMR), bioautographic and elementary analysis, M.P. 189–197° C.

*Analysis.*—Calc'd for $C_{33}H_{34}O_{10}N_2$ (percent): C, 64.07; H, 5.54; N, 4.59. Found (percent): C, 63.69; H, 5.31; N, 4.96. Minimum Inhibitory Concentration (MIC)

against *Staphylococcus aureaus* Smith (*Staph. aur.* Sm.) 0.13 mcg./ml. (without serum). CD$_{50}$: oral—0.9 mg./kg.; Intramuscular (IM)—7.4 mg./kg.

EXAMPLE 2

3-(2 - methoxycinnamamido) - 4 - hydroxy-8-methyl-7-[3-O-(5-methyl - 2 - pyrrolylcarbonyl)noviosyloxy] coumarin

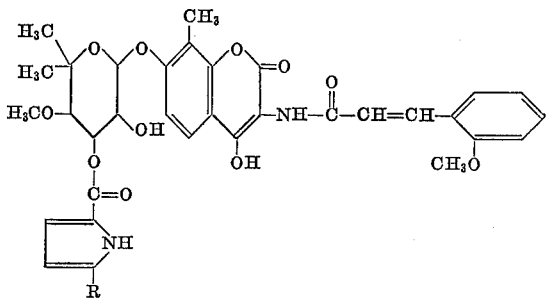

After refluxing an 8.9 g. portion of 2-methoxycinnamic acid with 45 ml. of thionyl chloride, the reaction mixture was concentrated in vacuo to dryness. Benzene was added and then distilled off in the same manner. The residue was dried in a desiccator over KOH pellets.

The acid chloride was dissolved in 100 ml. pyridine containing 10.2 g. tetrahydropyranyl coumermycin A$_1$ and to it was added 0.3 ml. H$_2$O. The reaction mixture was heated at 50° C. for three hours. The product was precipitated by pouring it into 1200 ml. of ice and water with vigorous stirring. After adjusting the pH to approximately 2.0 with concentrated HCl and stirring for one-half hour, the precipitate was recovered by filtering, washing with water and air drying; yield, 18.9 g.

The tetrahydropyranyl blocking group was removed by stirring the product in 450 ml. methanol with 6.0 g. p-toluenesulfonic acid for 23 hours at 25° C. The product was recovered as above by precipitating in water; yield, 14.5 g.

The product was purified by fractional precipitation from boiling ethyl acetate and Skellysolve B. The fifth fraction so obtained (972 mg.) was established by IR and NMR to be the desired title compound, M.P. 176°–184° C.

*Analysis.*—Calc'd for C$_{34}$H$_{36}$O$_{11}$N$_2$ (percent): C, 62.96; H, 5.59; N, 4.31. Found (percent): C, 63.30; H, 5.22; N, 5.32.

MIC against *Staph. aureus* Smith 0.25 mcg./ml. (without serum). CD$_{50}$: oral and IM>50 mg./kg.

EXAMPLE 3

3-(4 - methoxycinnamamido) - 4 - hydroxy - 8 - methyl-7-[3 - O - (5 - methyl - 2 - pyrrolylcarboyl)noviosyloxy]coumarin A 7.5 g. portion of 4-methoxycinnamic acid was added to 40 ml. of thionyl chloride. After refluxing for two hours over a steam bath, the solution was concentrated in vacuo to remove the excess thionyl chloride. The residue was stored in a desiccator overnight in the presence of KOH pellets.

The residue was then dissolved in 100 ml. pyridine and to it was added 0.3 ml. H$_2$O and a 10.25 g. portion of tetrahydropyranyl coumermycin A$_1$. The reaction flask was then heated to 50° C., stoppered, and heating continued for 18 hours. The solution was then concentrated in vacuo to a volume of 100 ml. and poured into a 1200 ml. mixture of well stirred ice and water. The pH was adjusted to 1.9 by the addition of concentrated HCl and the mixture then stirred for one-half hour. The precipitate was recovered by filtering and air drying; yield, 16.8 g. The product was then dissolved in 420 ml. of methanol, a 5.0 g. portion of p-toluenesulfonic acid added and the solution stirred for 18 hours at 25° C. The reaction mixture was cooled and poured into a well stirred 1200 ml. mixture of ice and water. The product was recovered by filtering, washing well with water and air drying: yield 14.5 g.

The product was dissolved in 375 ml. of boiling ethyl acetate and then fractionally precipitated by the addition of Skellysolve B to cloudiness and cooling in an ice bath. In this way, a number of fractions were obtained. The fifth fraction (3.7 g.) was established by IR, NMR and bioautograph to be the desired title compound. MIC against *Staph. aur.* Sm. 0.031 mcg./ml. CD$_{50}$: IM—1.7, oral—8.0.

*Analysis.*—Calc'd for C$_{34}$H$_{36}$O$_{11}$N$_2$ (percent): C, 62.96; H, 5.59; N, 4.31. Found (percent): C, 62.87; H, 5.25; N, 4.35, M.P. 183°–189° C.

EXAMPLE 4

3-(2-hydroxycinnamimido) - 4 - hydroxy-8-methyl-7-[3-O-(5-methyl-2-pyrrolylcarbonyl)noviosyloxy]coumarin An 8.2 g. portion of 2-hydroxycinnamic acid and 25 ml. acetic anhydride were dissolved in 82 ml. pyridine and the solution allowed to stand at 25° C. for 17 hours. The solution was then concentrated in vacuo to a thick sirup. Absolute ethanol was added and the mixture again concentrated to a sirup. The crystalline acetate derivative was obtained by dissolving in water and adjusting the pH to 2.0; yield, 7.8 g. The product was dried in a desiccator for 24 hours and then converted to the acid chloride by refluxing for 1½ hours in 45 ml. thionyl chloride. The acid chloride was recovered by concentrating in vacuo to dryness, adding and distilling off benzene and finally drying in a desiccator over anhydrous BaO and KOH pellets.

The acid chloride was then treated for 2 hours at 50° C. with an 80 ml. solution of pyridine containing 7.7 g. tetrahydropyranyl coumermycin A$_1$ and 0.24 ml. of water. The solid product formed was recovered by pouring the mixture into 1 liter of a vigorously stirred mixture of ice and water, the precipitate being recovered by filtering and air drying; yield 18.4 g.

An 8.4 g. portion of this material was dissolved in 200 ml. methanol, 2.5 g. p-toluenesulfonic acid added, and then the solution was stirred gently for 18 hours. The crude final product was recovered by precipitation from an ice and water mixture, filtering and air drying; yield 6.3 g. Purification was effected by dissolving the precipitate in 100 ml. boiling ethyl acetate, adding Skellysolve B until cloudiness occurred, cooling and then filtering. The seventh fraction thus obtained was found to be the title product, 3-(2-hydroxycinnamamido)-4-hydroxy - 8 - methyl-7-[3-O-(5-methyl-2-pyrrolylcarbonyl)noviosyloxy] coumarin, by IR, NMR and bioautograph; yield, 275 mg.

*Analysis.*—Calc'd for C$_{33}$H$_{34}$O$_{11}$N$_2$ (percent): C, 62.45; H, 5.40; N, 4.41. Found (percent): C, 61.8; H, 4.93; N, 4.34.

MIC against *Staphylococcus aureus* Smith, 0.13 mcg./ml. CD$_{50}$: IM—2.6, oral—20, M.P. 159°–170° C.

EXAMPLE 5

3-(4-hydroxycinnamamido)-4-hydroxy - 8 - methyl-7-[3-O-(5-methyl-2-pyrrolylcarbonyl)noviosyloxy]coumarin An 8.2 g. portion of p-acetoxycinnamic acid was refluxed in 40 ml. of thionyl chloride for two hours and then concentrated in vacuo to dryness. The excess thionyl chloride was removed by the addition of benzene and again concentrated to dryness in vacuo. The acid chloride was then dissolved in 100 ml. pyridine containing 10.2 g. tetrahydropyranyl coumermycin A$_1$. After the addition of 0.3 ml. H$_2$O, the solution was heated at 50° C. for 24 hours. The solution was then concentrated in vacuo to approximately one-third volume and poured into a vigorously stirred one liter mixture of ice and water. The pH was adjusted to 2.0 by means of concentrated HCl and the mixture was stirred for ¾ hour. The precipitate was recovered by filtering, washing well with water and air drying; yield, 16.8 g. The product was then dissolved in 420 ml. methanol, a 5.0 g. portion of p-toluenesulfonic acid was added and the solution was stirred for 18 hours at 25° C. The product was then recovered by precipitation in ice and water in the same manner as above; yield 12.4 g. Purification was effected by dissolving the solid in boiling ethyl acetate and then fractionally precipitating with Skellysolve B. The eighth fraction thus obtained, 1.44 g., was found to be the desired title product by IR, NMR and bioautograph.

Analysis.—Calc'd. for $C_{33}H_{34}O_{11}N_2$ (percent): C, 62.45; H, 5.40; N, 4.41. Found (percent): C, 61.95; H, 5.75; N, 4.36, M.P. 189°–196° C.

MIC against Staph. aur. Sm. 0.13 mcg./ml. $CD_{50}$: IM—1.8, Oral—2.8.

EXAMPLE 6

3-(4-carboxamidocinnamamido)-4-hydroxy - 8 - methyl-7-[3-O-(5-methyl - 2 - pyrrolylcarbonyl)noviosyloxy] coumarin Substitution in the procedure of Example 2 for the 2-methoxycinnamic acid used therein of 4-carboxamidocinnamic acid produces 3-(4-carboxamidocinnamamido)-3-hydroxy-8-methyl-7-[3-O-(5 - methyl-2-pyrrolylcarbonyl) noviosyloxy]coumarin.

EXAMPLE 7

3-(chlorocinnamamido)-4-hydroxy - 8 - methyl-7-[3-O-(5-methyl-2-pyrrolylcarbonyl)noviosyloxy]coumarin Substitution in the procedure of Example 2 for the 2-methoxycinnamic acid used therein of 2-chlorocinnamic acid, 3-chlorocinnamic acid or 4-chlorocinnamic acid produces respectively the 3-(2-chlorocinnamamido)-, 3-(3-chlorocinnamamido)-, or 3-(4-chlorocinnamamido)-4-hydroxy-8-methyl-7-[3-O-(5-methyl - 2 - pyrrolylcarbonyl) noviosyloxy]coumarins.

EXAMPLE 8

3-(3,4-dihydroxycinnamamido)-4-hydroxy - 8 - methyl-7-[3-O-(5-methyl - 2 - pyrrolylcarbonyl)noviosyloxy] coumarin Substitution in the procedure of Example 4 for the 2-hydroxycinnamic acid used therein of 3,4-dihydroxycinnamic acid produces 3-(3,4-dihydroxycinnamamido)-4-hydroxy - 8 - methyl-7-[3-O-(5-methyl - 2 - pyrrolylcarbonyl)noviosyloxy]coumarin.

EXAMPLE 9

3-(dimethoxycinnamamido)-4-hydroxy - 8 - methyl-7-[3-O-(5-methyl-2-pyrrolylcarbonyl)noviosyloxy]coumarin Substitution in the procedure of Example 2 for the 2-methoxycinnamic acid used therein of 2,3-dimethoxycinnamic acid 3,4-dimethoxycinnamic acid or 3,5-dimethoxycinnamic acid produces respectively the 3-(2,3-dimethoxycinnamamido)-, 3-(3,4-dimethoxycinnamamido)-, or 3-(3,5-dimethoxycinnamamido)-4-hydroxy - 8 - methyl-7-[3-O-(5-methyl - 2 - pyrrolylcarbonyl)noviosyloxy]coumarins.

EXAMPLE 10

3-(3,5-dimethoxy-4-hydroxycinnamamido) - 4 - hydroxy-8-methyl - 7 - [3-O-(5-methyl - 2 - pyrrolylcarbonyl) noviosyloxy]coumarin Substitution in the procedure of Example 4 for the 2-hydroxycinnamic acid used therein of 3,5-dimethoxy-4-hydroxycinnamic acid produces 3-(3,5-dimethoxy-4-hydroxycinnamamido) - 4 - hydroxy-8-methyl-7-[3-O-(5-methyl-2-pyrrolylcarbonyl)noviosyloxy]coumarin.

EXAMPLE 11

3-(4-methylcinnamamido)-4-hydroxy - 8 - methyl-7-[3-O-(5-methyl-2-pyrrolylcarbonyl)noviosyloxy]coumarin Substitution in the procedure of Example 2 for the 2-methoxycinnamic acid used therein of 4-methylcinnamic acid produces 3-(4-methylcinnamamido)-4-hydroxy-8-methyl-7-[3-O-(5-methyl - 2 - pyrrolylcarbonyl)noviosyloxy]coumarin.

EXAMPLE 12

3-(nitrocinnamamido)-4-hydroxy-8-methyl-7-[3-O-(5-methyl-2-pyrrolylcarbonyl)noviosyloxy]coumarin Substitution in the procedure of Example 2 for the 2-methoxycinnamic acid used therein of 2-nitrocinnamic acid, 3-nitrocinnamic acid or 4-nitrocinnamic acid produces respectively the 3-(2-nitrocinnamamido)-, 3-(3-nitrocinnamamido)-, or 3-(4-nitrocinnamamido)-4-hydroxy-8-methyl-7-[3-O-(5 - methyl-2-pyrrolylcarbonyl)noviosyloxy]coumarins.

EXAMPLE 13

3-(bromocinnamamido)-4-hydroxy-8-methyl-7-[3-O-(5-methyl-2-pyrrolylcarbonyl)noviosyloxy]coumarin Substitution in the procedure of Example 2 for the 2-methoxycinnamic acid used therein of 2-bromocinnamic acid, 3-bromocinnamic acid or 4-bromocinnamic acid produces respectively the 3-(2-bromocinnamamido)-, 3-(3-bromocinnamamido)-, or 3-(4-bromocinnamamido)-4-hydroxy-8-methyl-7-[3 - O - (5-methyl-2-pyrrolylcarbonyl) noviosyloxy]coumarins.

EXAMPLE 14

3 - (2-chloro-4-dimethylaminocinnamamido)-4-hydroxy-8-methyl-7-[3-O-(5 - methyl-2-pyrrolylcarbonyl)noviosyloxy]coumarin Substitution in the procedure of Example 2 for the 2-methoxycinnamic acid used therein of 2-chloro-4-dimethylaminocinnamic acid produces 3-(2-chloro-4-dimethylaminocinnamamido)-4-hydroxy - 8 - methyl-7-[3-O-(5-methyl-2-pyrrolylcarbonyl)noviosyloxy]coumarin.

EXAMPLE 15

3 - (4-trifluoromethylcinnamamido)-4-hydroxy-8-methyl-7-[3-O-(5-methyl - 2 - pyrrolylcarbonyl)noviosyloxy] coumarin Substitution in the procedure of Example 2 for the 2-methoxycinnamic acid used therein of 4-trifluoromethylcinnamic acid produces 3-(4-trifluoromethylcinnamamido)-4-hydroxy-8-methyl-7-[3-O-(5 - methyl-2-pyrrolylcarbonyl)noviosyloxy]coumarin.

EXAMPLE 16

3-(4-cyanocinnamamido)-4-hydroxy-8-methyl-7-[3-O-(5-methyl-2-pyrrolylcarbonyl)noviosyloxy]coumarin Substitution in the procedure of Example 2 for the 2-methoxycinnamic acid used therein of 4-cyanocinnamic acid produces 3-(4-cyanocinnamamido) - 4 - hydroxy-8-methyl-7-[3-O-(5-methyl - 2 - pyrrolylcarbonyl)noviosyloxy]coumarin.

EXAMPLE 17

3-(dichlorocinnamamido)-4-hydroxy-8-methyl-7-[3-O-(5-methyl-2-pyrrolylcarbonyl)noviosyloxy]coumarin Substitution in the procedure of Example 2 for the 2-methoxycinnamic acid used therein of 2,6-dichlorocinnamic acid or 3,4-dichlorocinnamic acid produces respectively 3-(2,6-dichlorocinnamamido)-, or 3-(3,4-dichlorocinnamamido)-4-hydroxy-8-methyl-7-[3-O-(5 - methyl-2-pyrrolylcarbonyl)noviosyloxy]coumarin.

EXAMPLE 18

3 - (4-diethylaminocinnamamido)-4-hydroxy-8-methyl-7-[3-O - (5-methyl-2-pyrrolylcarbonyl)noviosyloxy]coumarin Substitution in the procedure of Example 2 for the 2-methoxycinnamic acid used therein of 4-diethylaminocinnamic acid produces 3-(4-diethylaminocinnamamido)-4-hydroxy-8-methyl-7-[3-O-(5 - methyl-2-pyrrolylcarbonyl)noviosyloxy]coumarin.

EXAMPLE 19

3-(fluorocinnamamido)-4-hydroxy-8-methyl-7-[3-O-(5-methyl-2-pyrrolylcarbonyl)noviosyloxy]coumarin Substitution in the procedure of Example 2 for the 2-methoxycinnamic acid used therein of 2-fluorocinnamic acid, 3-fluorocinnamic acid or 4-fluorocinnamic acid produces respectively 3-(2-fluorocinnamamido)-, 3-(3-fluorocinnamamido)-, or 3-(4-fluorocinnamamido)-4-hydroxy-8-methyl-7-[3-O-(5 - methyl-2-pyrrolylcarbonyl)noviosyloxy]coumarins.

EXAMPLE 20

3 - (4 - thioacetoxycinnamamido)-4-hydroxy-8-methyl-7-[3-O-(5 - methyl-2-pyrrolylcarbonyl)noviosyloxy]coumarin Substitution in the procedure of Example 2 for the 2-methoxycinnamic acid used therein of 4-thioacetoxycinnamic acid produces 3-(4-thioacetoxycinnamamido)-4-hydroxy-8-methyl-7-[3-O-(5 - methyl-2-pyrrolylcarbonyl) noviosyloxy]coumarin.

EXAMPLE 21

3 - (4-mercaptocinnamamido)-4-hydroxy-8-methyl-7-[3-O-(5 - methyl-2-pyrrolylcarbonyl)noviosyloxy]coumarin Hydrolysis of the 3-(4-thioacetoxycinnamamido)-4-hydroxy-8-methyl-7-[3-O-(5-methyl - 2 - pyrrolylcarbonyl) noviosyloxy]-coumarin from Example 20 under mild conditions produces 3-(4-mercaptocinnamamido)-4-hydroxy-8-methyl-7-[3-O-(5 - methyl-2-pyrrolylcarbonyl)noviosyloxy-coumarin.

EXAMPLE 22

3 - (2-carbomethoxycinnamamido)-4-hydroxy-8-methyl-7-[3-O-(5 - methyl-2-pyrrolylcarbonyl)noviosyloxy]coumarin Substitution in the procedure of Example 2 for the 2-methoxycinnamic acid used therein of 2-carbomethoxycinnamic acid produces 3-(2-carbomethoxycinnamamido)-4-hydroxy-8-methyl-7-[3-O-(5 - methyl-2-pyrrolylcarbonyl)noviosyloxy]coumarin.

EXAMPLE 23

3 - [3 - (N,N-dimethylcarboxamido)cinnamamido]-4-hydroxy-8-methyl-7-[3-O-(5 - methyl-2-pyrrolylcarbonyl) noviosyloxy]coumarin.

Substitution in the procedure of Example 2 for the 2-methoxycinnamic acid used therein of 3-(N,N-dimethylcarboxamido)cinnamic acid produces 3-[3-(N,N-dimethylcarboxamido)cinnamamido]-4-hydroxy-8-methyl - 7-[3-O-(5-methyl-2-pyrrolylcarbonyl)noviosyloxy]coumarin.

EXAMPLE 24

3-(2-methylthiocinnamamido) - 4 - hydroxy-8-methyl-7-[3 - O - (5 - methyl-2-pyrrolylcarbonyl)noviosyloxy] coumarin Substitution in the procedure of Example 2 for the 2-methoxycinnamic acid used therein of 2-methylthiocinnamic acid produces 3 - (2 - methylthiocinnamamido)-4-hydroxy-8-methyl-7-[3-O - (5-methyl-2-pyrrolylcarbonyl) noviosyloxy]coumarin.

EXAMPLE 25

3-(aminocinnamamido)-4-hydroxy-8-methyl-7-[3-O-(5-methyl-2-pyrrolylcarbonyl)noviosyloxy]coumarin Hydrogenation of the 2-nitrocinnamamido, 3-nitrocinnamamido or 4-nitrocinnamamido-coumarins of Example 12 under mild conditions at low pressure and temperatures using a catalyst such as palladium on carbon produces respectively the 3-(2-aminocinnamamido-, 3-(3-aminocinnamamido)-, or 3 - (4 - aminocinnamamido)-4-hydroxy-8-methyl-7-[3-O - (5-methyl-2-pyrrolylcarbonyl) noviosyloxy]-coumarins.

EXAMPLE 26

3-(2,6-dichloro - 4 - nitrocinnamamido) - 4 - hydroxy-8-methyl-7-[3-O-(5-methyl - 2 - pyrrolylcarbonyl)noviosyloxy]coumarin Substitution in the procedure of Example 2 for the 2-methoxycinnamic acid used therein of 2,6-dichloro-4-nitrocinnamic acid produces 3-(2,6-dichloro-4-nitrocinnamamido)-4-hydroxy-8-methyl-7-[3 - O - (5 - methyl-2-pyrrolylcarbonyl)noviosyloxy]-coumarin.

EXAMPLE 27

3-(4-amino - 2,6 - dichlorocinnamamido)-4-hydroxy - 8-methyl-7-(3-O-(5-methyl - 2 - pyrrolylcarbonyl)noviosyloxy]coumarin Substitution in the procedures of Example 25 for the 3-(nitrocinnamamido)-4-hydroxy-8-methyl - 7 - [3-O-(5-methyl - 2 - pyrrolylcarbonyl)noviosyloxy]coumarin used therein of 3-(2,6-dichloro - 4 - nitrocinnamamido) - 4-hydroxy-8-methyl-7-[3-O-(5-methyl - 2 - pyrrolylcarbonyl) noviosyloxy]coumarin produces 3-(4-amino-2,6-dichlorocinnamamido)-4-hydroxy-8-methyl-7-[3-O-(5 - methyl-2-pyrrolylcarbonyl)noviosyloxy]coumarin.

EXAMPLE 28

3-cinnamamido-4-hydroxy-8-methyl-7-[3-O-(5-methyl-2-pyrrolylcarbonyl)noviosyloxy]coumarin Substitution in the procedure of Example 1 for the cinnamoyl chloride used therein of cinnamic anhydride produces 3-cinnamamido-4-hydroxy-8-methyl - 7 - [3-O-(5-methyl-2-pyrrolylcarbonyl)noviosyloxy]coumarin.

EXAMPLE 29

3-cinnamamido-4-hydroxy-8-methyl-7-[3-O-(5-methyl-2-pyrrolylcarbonyl)noviosyloxy]coumarin Substitution in the procedure of Example 1 for the cinnamoyl chloride used therein of the mixed anhydride prepared from cinnamic acid and ethyl chloroformate produces 3-cinnamamido-4-hydroxy-8-methyl-7 - [3-O-(5-methyl-2-pyrrolylcarbonyl)-noviosyloxy]coumarin.

EXAMPLE 30

3-cinnamamido-4-hydroxy-8-methyl-7-[3-O-(2-pyrrolylcarbonyl)-noviosyloxy]coumarin Substitution in the procedure of Example 1 for the tetrahydropyranyl coumermycin $A_1$ used therein of tetrahydropyranyl coumermycin $A_2$ produces 3-cinnamamido-4 - hydroxy - 8 - methyl - 7 - [3-O-(2-pyrrolylcarbonyl) noviosyloxy]coumarin.

EXAMPLE 31

Sodium salt of 3-cinnamamido-4-hydroxy - 8 - methyl-7-[3-O-(5-methyl - 2 - pyrrolylcarbonyl)noviosyloxy] coumarin 3 - cinnamamido-4-hydroxy-8-methyl-7-[3-O-(5-methyl-2-pyrrolylcarbonyl)noviosyloxy]coumarin, obtained from Example 1, is dissolved in an acetone-triethylamine mixture to which is added an acetone solution of sodium 2-ethylhexanoate (SEH) containing slightly more than an equivalent amount of SEH to precipitate the desired mono-sodium salt.

The potassium salt may be formed in a similar manner.

EXAMPLE 32

3-(2-carboxycinnamamido) - 4 - hydroxy - 8 - methyl-7-[3 - O - (5 - methyl-2-pyrrolylcarbonyl)noviosyloxy] coumarin Hydrolysis of the 3-(2-carbomethoxycinnamamido)-4-hydroxy-8-methyl - 7 - [3-O-(5-methyl-2-pyrrolylcarbonyl) noviosyloxy]-coumarin from Example 22 under mild conditions produces 3-(2-carboxycinnamamido)-4-hydroxy-8-methyl-7-[3-O-(5 - methyl - 2 - pyrrolylcarbonyl)noviosyloxy]coumarin.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:

1. A compound having the formula

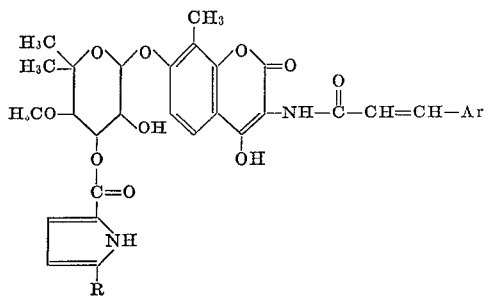

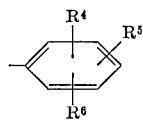

wherein R is either hydrogen or methyl, and Ar is a group having the formula

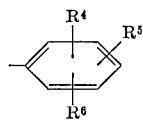

in which each of $R^4$, $R^5$ and $R^6$ represents hydrogen, fluoro, chloro, bromo, iodo, trifluoromethyl, trichloromethyl, amino, N-(lower)alkylamino, N,N-di(lower)alkylamino, nitro, cyano, (lower)alkyl, (lower)alkoxy, hydroxy, carboxamido, N-(lower)alkylcarboxamido, N,N-di(lower)alkylcarboxamido, carboxy, carb(lower)alkoxy, acetoxy, mercapto, thioacetoxy or (lower)alkylthio; or a nontoxic pharmaceutically-acceptable alkali metal, alkaline earth metal or tertiary amine salt thereof.

2. A compound of claim 1 having the formula

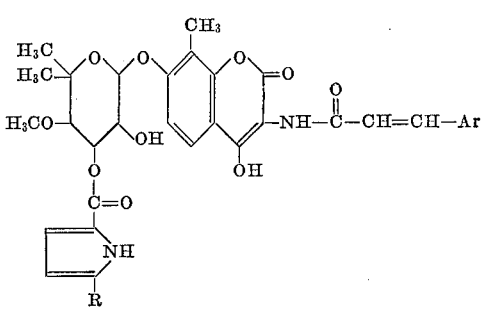

wherein R is either hydrogen or methyl, and Ar is a group having the formula

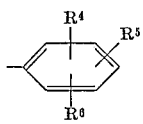

in which each of $R^4$, $R^5$ and $R^6$ represents hydrogen, fluoro, chloro, bromo, iodo, trifluoromethyl, amino, N,N-di(lower)alkylamino, nitro, cyano, (lower)alkyl, (lower)alkoxy, hydroxy, carboxy, carb(lower)alkoxy, acetoxy, mercapto, thioacetoxy or (lower)alkylthio; or a nontoxic pharmaceutically-acceptable alkali metal, alkaline earth metal or tertiary amine salt thereof.

3. A compound of claim 1 having the formula

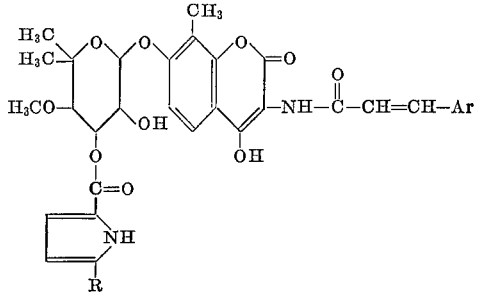

wherein R is either hydrogen or methyl, and Ar is a group having the formula

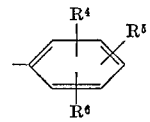

in which each of $R^4$, $R^5$ and $R^6$ each represent hydrogen, fluoro, chloro, bromo, iodo, trifluoromethyl, N,N-di(lower)alkylamino, nitro, cyano, (lower)alkyl, (lower)alkoxy, N,N-di(lower)alkylcarboxamido, carb(lower)alkoxy, acetoxy, thioacetoxy or (lower)alkylthio; or a nontoxic pharmaceutically-acceptable alkali metal, alkaline earth metal or tertiary amine salt thereof.

4. A compound of claim 1 having the formula

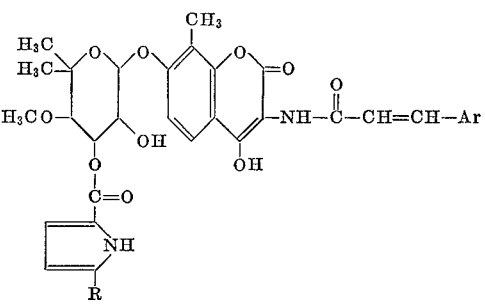

wherein R is either hydrogen or methyl and Ar is a group having the formula

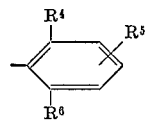

in which $R^4$, $R^5$ and $R^6$ represents hydrogen, fluoro, chloro, bromo, iodo, trifluoromethyl, amino, N,N-di(lower)alkylamino, nitro, cyano, (lower)alkyl, (lower)alkoxy, hydroxy, N,N-di(lower)alkylcarboxamide, carboxy, carb(lower)alkoxy, acetoxy, mercapto, thioacetoxy or (lower)alkylthio; and wherein no more than one of the group $R^4$, $R^5$ and $R^6$ shall be hydrogen; or a nontoxic pharmaceutically-acceptable alkali metal, alkaline earth metal or tertiary amine salt thereof.

5. A compound of claim 1 having the formula

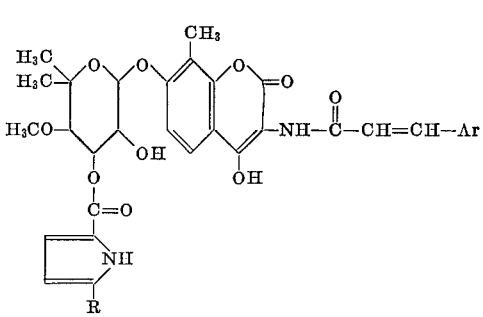

wherein R is either hydrogen or methyl, and Ar is a group having the formula

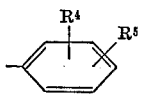

in which each of R⁴ and R⁵ represents hydrogen, fluoro, chloro, bromo, iodo, trifluoromethyl, amino, N,N-di-(lower)alkylamino, nitro, cyano, (lower)alkyl, (lower)-alkoxy, hydroxy, N,N-di(lower)alkylcarboxamido, carboxy, carb(lower)alkoxy, acetoxy, mercapto, thioacetoxy or (lower)alkylthio; or a nontoxic pharmaceutically-acceptable alkali metal, alkaline earth metal or tertiary amine salt thereof.

6. A compound of claim 1 having the formula

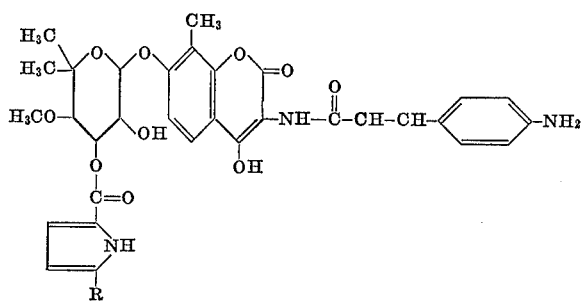

wherein R is either hydrogen or methyl or a nontoxic pharmaceutically-acceptable alkali metal, alkaline earth metal or tertiary amine salt thereof.

7. A compound of claim 1 having the formula

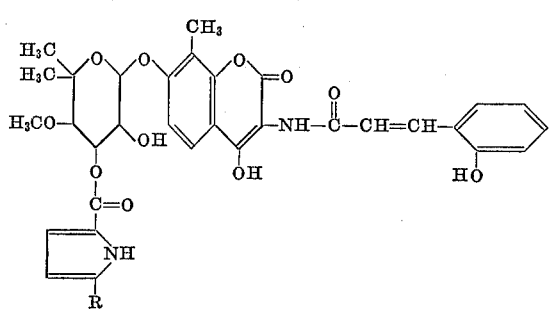

wherein R is either hydrogen or methyl; or a nontoxic pharmaceutically-acceptable alkali metal, alkaline earth metal or tertiary amine salt thereof.

8. A compound of claim 1 having the formula

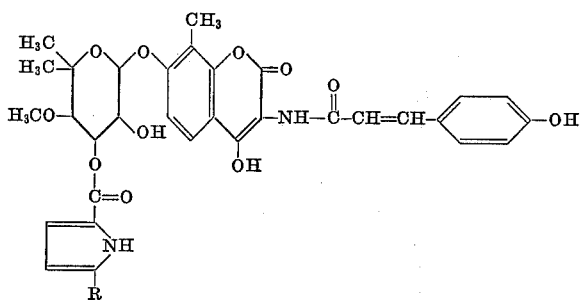

wherein R is either hydrogen or methyl; or a nontoxic pharmaceutically-acceptable alkali metal, alkaline earth metal or tertiary amine salt thereof.

9. A compound of claim 1 having the formula

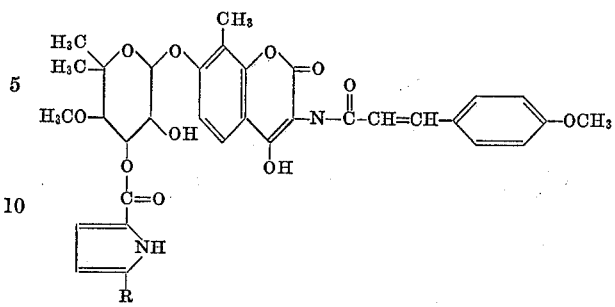

wherein R is either hydrogen or methyl; or a nontoxic pharmaceutically-acceptable alkali metal, alkaline earth metal or tertiary amine salt thereof.

10. A compound of claim 1 having the formula

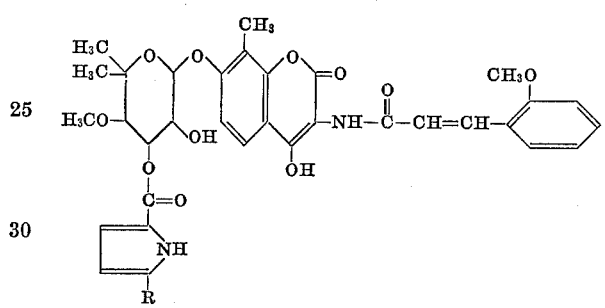

wherein R is either hydrogen or methyl; or a nontoxic pharmaceutically-acceptable alkali metal, alkaline earth metal or tertiary amine salt thereof.

11. A compound of claim 1 having the formula

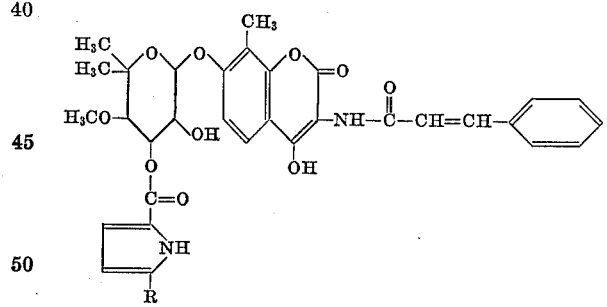

wherein R is either hydrogen or methyl; or a nontoxic pharmaceutically-acceptable alkali metal, alkaline earth metal or tertiary amine salt thereof.

12. A compound of claim 1 having the formula

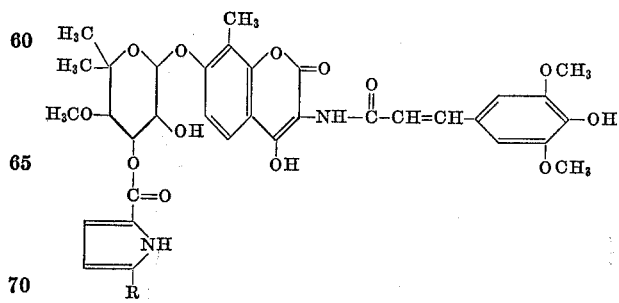

wherein R is either hydrogen or methyl; or a nontoxic pharmaceutically-acceptable alkali metal, alkaline earth metal or tertiary amine salt thereof.

13. A compound of claim 1 having the formula

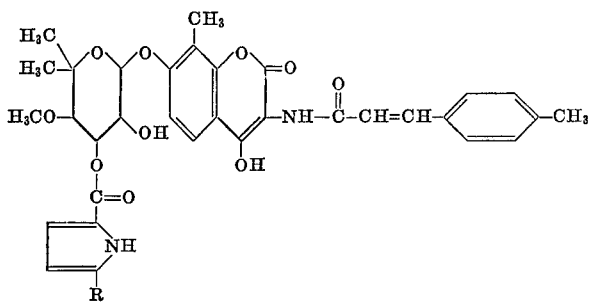

wherein R is either hydrogen or methyl; or a nontoxic pharmaceutically-acceptable alkali metal, alkaline earth metal or tertiary amine salt thereof.

14. A compound of claim 1 having the formula

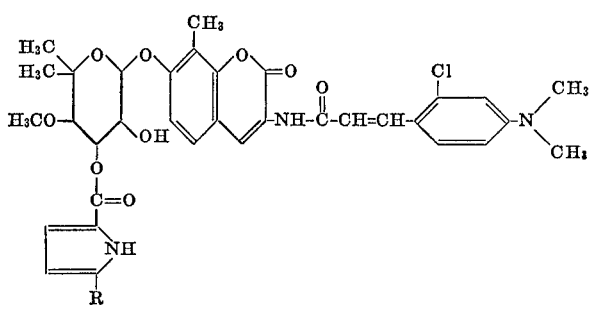

wherein R is either hydrogen or methyl; or a nontoxic pharmaceutically-acceptable alkali metal, alkaline earth metal or tertiary amine salt thereof.

15. A compound of claim 1 having the formula

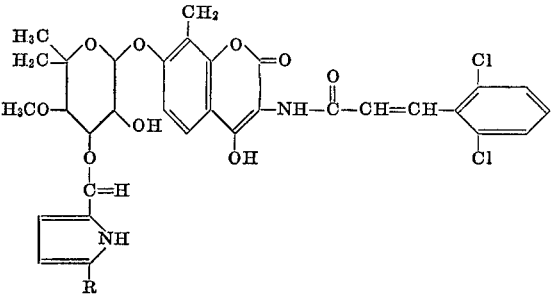

wherein R is hydrogen or methyl; or a nontoxic pharmaceutically-acceptable alkali metal, alkaline earth metal or tertiary amine salt thereof.

16. A compound of claim 1 having the formula

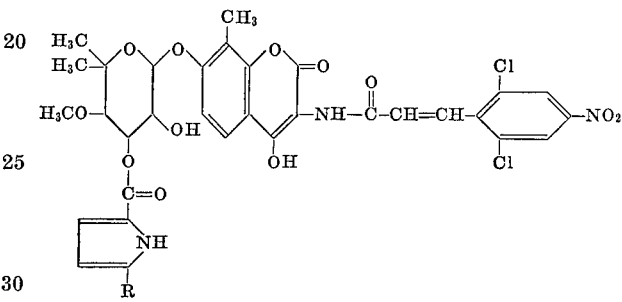

wherein R is either hydrogen or methyl; or a nontoxic pharmaceutically-acceptable alkali metal, alkaline earth metal or tertiary amine salt thereof.

References Cited
UNITED STATES PATENTS

| | | | |
|---|---|---|---|
| 3,428,623 | 2/1969 | Keil et al. | 260—210 |
| 3,454,548 | 7/1969 | Keil et al. | 260—210 |

LEWIS GOTTS, Primary Examiner

J. R. BROWN, Assistant Examiner

U.S. Cl. X.R.

424—180

PO-1050
(5/69)

UNITED STATES PATENT OFFICE
CERTIFICATE OF CORRECTION

Patent No. __3,547,903__    Dated __December 15, 197__

Inventor(s) __M. J. Cron, E. A. Ragan and I. R. Hooper__

It is certified that error appears in the above-identified patent and that said Letters Patent are hereby corrected as shown below:

The formula of Claim 6 should read as follows:

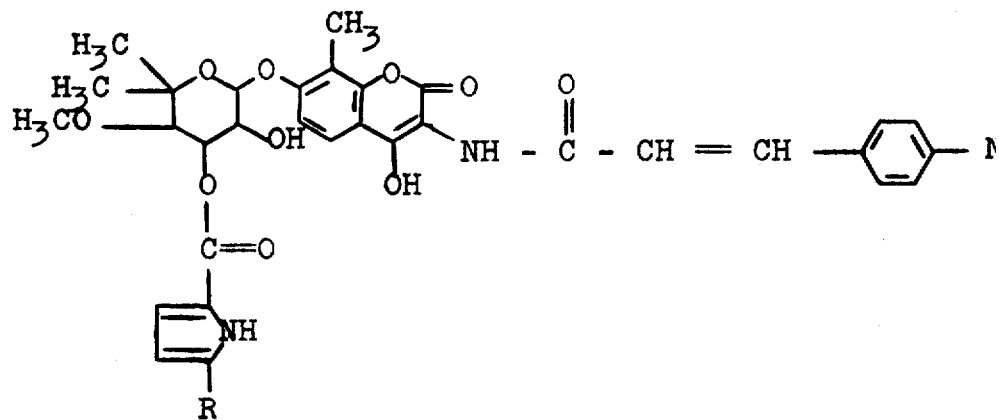

SIGNED AND
SEALED
MAR 9 1971

(SEAL)
Attest:

Edward M. Fletcher, Jr.
Attesting Officer

WILLIAM E. SCHUYLE
Commissioner of Pa